(12) United States Patent
Oh et al.

(10) Patent No.: US 9,246,375 B2
(45) Date of Patent: Jan. 26, 2016

(54) VIBRATOR FOR GENERATING HORIZONTAL VIBRATION

(75) Inventors: Seong-Kwan Oh, Incheon (KR); Hyuk-Sang Ahn, Incheon (KR); Ki-Hwan Hong, Bucheon-si (KR); In-Jae Lee, Seoul (KR); Hyun-Ki Yang, Incheon (KR)

(73) Assignee: MOATECH CO., LTD., Namdong-Gu, Incheon (KR)

( * ) Notice: Subject to any disclaimer, the term of this patent is extended or adjusted under 35 U.S.C. 154(b) by 345 days.

(21) Appl. No.: 13/821,216

(22) PCT Filed: Sep. 9, 2011

(86) PCT No.: PCT/KR2011/006693
§ 371 (c)(1),
(2), (4) Date: Mar. 6, 2013

(87) PCT Pub. No.: WO2012/036425
PCT Pub. Date: Mar. 22, 2012

(65) Prior Publication Data
US 2013/0169072 A1   Jul. 4, 2013

(30) Foreign Application Priority Data

Sep. 14, 2010 (KR) .................. 10-2010-0090229
Sep. 14, 2010 (KR) .................. 10-2010-0090230

(51) Int. Cl.
*H02K 35/02* (2006.01)
*H02K 33/16* (2006.01)
(Continued)

(52) U.S. Cl.
CPC ............ *H02K 35/02* (2013.01); *B06B 1/045* (2013.01); *H02K 15/00* (2013.01); *H02K 33/16* (2013.01); *Y10T 29/49009* (2015.01)

(58) Field of Classification Search
CPC ....... H02K 35/00; H02K 35/02; H02K 33/00; H02K 33/02; H02K 33/16
USPC .................................. 310/36, 25, 20
See application file for complete search history.

(56) References Cited

U.S. PATENT DOCUMENTS

2011/0101796 A1* 5/2011 Odajima et al. ................. 310/25
2012/0313459 A1* 12/2012 Zhang ............................. 310/25

FOREIGN PATENT DOCUMENTS

JP    2002-143770       5/2002
JP    2002143770 A  *  5/2002  ............. H02K 33/16

(Continued)

OTHER PUBLICATIONS

Machine translation of KR20100002069A (Jan. 2010).*
(Continued)

*Primary Examiner* — Michael Andrews
(74) *Attorney, Agent, or Firm* — John K. Park; Park Law Firm

(57) ABSTRACT

The invention relates to a vibration generator which is used in devices, such as mobile phones, requiring a vibration mode. More specifically, the invention relates to a horizontal vibration type vibration generator which includes a casing that is open on one surface thereof, a vibration part having a weight provided inside the casing, and a spring mounted inside the casing, and which produces horizontal vibration by using the phenomenon of resonance which occurs by causing oscillation in an electromagnetic force having the same frequency as the intrinsic vibration frequency of the spring, and which solves the problem of a reduction in the life span of the vibration generator due to mechanical friction as seen in existing mechanical vibration generators, and generates a large vibration force despite having a thin construction unachievable in a vertical moving type vibration generator. The invention also relates to a production method of the vibration generator.

13 Claims, 11 Drawing Sheets

(51) Int. Cl.
    *B06B 1/04*    (2006.01)
    *H02K 15/00*  (2006.01)

(56) References Cited

FOREIGN PATENT DOCUMENTS

| JP | 2006-159139 | | 6/2006 | |
| KR | 10-0283495 | | 3/2001 | |
| KR | 10-2010-0002069 | | 1/2010 | |
| KR | 20100002069 A | * | 1/2010 | ............ H02K 33/12 |
| KR | 10-2010-0028234 | | 3/2010 | |

OTHER PUBLICATIONS

Machine translation of JP 2002143770 A (May 2002).*

* cited by examiner (a)  (b)

(a)　　　　　　　　　　　　　　　(b)

VIBRATOR FOR GENERATING HORIZONTAL VIBRATION

TECHNICAL FIELD

The present invention relates, in general, to vibration generators used in devices, such as mobile phones, requiring a vibration mode and, more particularly, to a horizontal vibration type vibration generator and a method of producing the vibration generator, in which the vibration generator includes a casing that is open on one side thereof, a vibration part having a weight provided inside the casing, and a spring mounted inside the casing, and produces horizontal vibration using the phenomenon of resonance which occurs by causing oscillation in an electromagnetic force having the same frequency as the intrinsic vibration frequency of the spring, and solves the problem of a reduction in the expected life span of the vibration generator due to mechanical friction as seen in related art mechanical vibration generators, and generates a large vibration force despite having a thin construction unachievable in vertical moving type vibration generators.

BACKGROUND ART

In the related art, examples of vibration generators used in devices, such as mobile phones, requiring a vibration mode are a vibration motor in which an eccentric type or eccentric mass type weight is installed in a brush DC motor, a BLOC vibration motor in which an eccentric type weight is installed in a rotor, a coin type vibration motor, a vertical vibration motor using resonance, etc. However, the related art vibration generators are problematic in that they cannot efficiently realize certain requirements, such as long life span, reliability, thinness, and high vibration force that are required by devices such as mobile phones.

For example, the vibration generators using the brush DC motors are problematic in that when a brush passes through a gap between segments of a commutator, the brush induces mechanical friction, electric sparks, and abrasion, thereby producing impurities and reducing the expected life span of the vibration generators.

Further, in an effort to overcome the problems of the vibration generators using the brush DC motors, the vertical vibration motors that move upward and downward using resonance can generate resonance vibration in a moving assembly having both a spring and a weight by causing oscillation in an electromagnetic force due to a mutual interaction between the electromagnetic force and a magnetic field. However, the vertical vibration motors are mechanically problematic in that they have a vertically moving mechanism using an elastic body, and so they inevitably require a mechanical space in which the vibration generators can move upward and downward, and this hinders any efforts to reduce the height of the vibration generator.

Further, in the related art, to install various types of vibration motors in limited spaces of devices such as mobile phones, it is required to form an additional space in the devices for receiving a power supply unit provided in a protruding terminal of the vibration motor. Another problem of the related art vibration motor resides in that it is required to connect a lead wire to an external power supply. Here, to electrically connect the lead wire to the external power supply, soldering is used. However, the connection using soldering is problematic in that it may be poorly soldered, a wire may be broken, or a short may occur. Another problem of the connection using soldering resides in that wiring is difficult to be use because of a limited space.

SUMMARY OF INVENTION

Technical Problem

Accordingly, the present invention has been made keeping in mind the above problems occurring in the related art, and is intended to provide a horizontal vibration type vibration generator, which includes a casing that is open on one side thereof, a vibration part having a weight provided inside the casing, and a spring mounted inside the casing, and produces horizontal vibration using the phenomenon of resonance which occurs by causing oscillation in an electromagnetic force having the same frequency as the intrinsic vibration frequency of the spring, and solves the problem of a reduction in the expected life span of the vibration generator due to mechanical friction as seen in related art mechanical vibration generators, and generates a large vibration force despite having a thin construction unachievable in vertical moving type vibration generators.

Further, the present invention serves to provide a horizontal vibration type vibration generator, in which a circuit board member is mounted to a lower part of the casing, thereby realizing an improved construction of the vibration generator and allowing a surface mounting technology to be adapted, and manufacturing the vibration generators by an automated process, and which uses no additional lead wires, thereby realizing improved connection reliability.

Further, the present invention serves to provide a method of producing vibration generators, which can reduce the assembly allowance of assembled parts and can improve assembly efficiency during a process of producing the horizontal vibration type vibration generators, thereby improving reliability of products and reducing the production cost.

Technical Solution

In an aspect, the present invention provides a vibration generator, including: a casing that is open on one surface thereof; a vibration part having a weight provided inside the casing; a spring mounted inside the casing; and a magnetic field generating part including a magnet that generates an electromagnetic force so as to cause the vibration part to horizontally vibrate, and an air-core coil that is placed in such a way that the coil is spaced apart from the magnet by a predetermined gap.

Further, in the present invention, the vibration part may include: a bracket providing a predetermined space in the casing, and the weight installed in the bracket.

Further, in the present invention, the spring may be mounted to the casing at a first end thereof and may be mounted to the weight at a second end thereof in a state in which the spring surrounds the weight in a U-shaped form.

Further, in the present invention, the air-core coil may be provided with an inner space therein and a core may be installed in the inner space of the air-core coil.

Further, in the present invention, the weight may comprise a first weight having a depression and a second weight having an opening, wherein the magnet is seated in the depression of the first weight and is inserted into the opening of the second weight, with an interposition of a metal yoke.

Further, in the present invention, the magnetic field generating part may be mounted to a base that is assembled so as to close the open surface of the casing, wherein an FPC (Flexible Printed Circuit) having a circuit pattern is mounted to an upper surface of the base and the air-core coil in which a core is installed is mounted to an upper surface of the FPC.

Further, in the present invention, the casing and the bracket may be provided with a plurality of positioning holes so as to allow an installing position of the bracket to be easily viewed when the bracket is installed in the casing.

Further, in the present invention, the magnet may be a magnet made of an Nd—Fe—B sintered body, in which the magnet is magnetized at two poles (an N-pole and an S-pole) on the left and the right.

Further, in the present invention, the casing may be provided with a plurality of 凹-shaped parts or a plurality of 凸-shaped parts on an outer circumferential edge thereof, and the base may be provided with 凸-shaped parts or 凹-shaped parts on an outer circumferential edge thereof so that the casing and the base are assembled with each other by an engagement method.

Further, in the present invention, the weight may comprise one weight having an opening, and both the magnet and a yoke may be inserted in the opening of the weight.

Further, in the present invention, a circuit board member may be mounted to the open surface of the casing, wherein a connection means is provided on a surface of the circuit board member so that the air-core coil is mounted to the circuit board member in a state in which the air-core coil is electrically connected to the circuit board member by the connection means.

Further, in the present invention, the circuit board member may be a PCB (Printed Circuit Board).

Further, in the present invention, the PCB may be provided with a positioning hole that has a shape similar to a shape of a core of the air-core coil.

Further, in the present invention, the casing may be provided on an outer circumferential edge thereof with an engagement part comprising at least one assembling notch or at least one assembling protrusion, and the circuit board member may be provided on an outer circumferential edge thereof with an engagement part comprising at least one assembling protrusion or at least one assembling notch so that the casing and the circuit board member are assembled with each other by an engagement method.

Further, in the present invention, the circuit board member may be provided along a thickness surface thereof with a contact part that comes into contact with an inner circumferential surface of the casing.

Further, in the present invention, when the circuit board member is mounted to the open surface of the casing, a predetermined gap may remain between the circuit board member and an inner circumferential surface of the casing, wherein solder is applied to the gap so that the circuit board member is mounted to the casing.

Further, in the present invention, the circuit board member may be configured such that the circuit board member is formed using a surface mounting technology (SMT).

In another aspect, the present invention provides a method of producing a vibration generator that includes: a casing that is open on one surface thereof; a vibration part having a weight provided inside the casing; a spring mounted inside the casing; a magnetic field generating part having a magnet that generates an electromagnetic force so as to cause the vibration part to horizontally vibrate, and an air-core coil that is placed in such a way that the coil is spaced apart from the magnet by a predetermined gap; and a base that is assembled so as to close the open surface of the casing, the method including: a first assembling process, in which the magnet is inserted into the weight, the weight is mounted to the spring, and the spring is mounted to the casing; a second assembling process which is processed separately from the first assembling process and in which the air-core coil is mounted to the base; a third assembling process, in which a first assembly produced by the first assembling process and a second assembly produced by the second assembling process are assembled with each other into a vibration generator.

Further, in the vibration generator producing method of the present invention, the first assembling process may include: inserting the magnet into the weight; applying a bonding agent that fixes the magnet and the weight; hardening the applied bonding agent so as to fix the magnet and the weight; mounting the spring to the weight by welding; and welding the spring to the casing.

Further, in the vibration generator producing method of the present invention, when both the air-core coil and an FPC (Flexible Printed Circuit) are mounted to the base, the second assembling process may include: seating a positioning hole of the base on a center pin of a base assembly jig after aligning the positioning hole of the base with the center pin; seating a positioning hole of the FPC on the center pin of the base assembly jig after aligning the positioning hole of the FPC with the center pin; seating a positioning hole of the air-core coil on the center pin of the base assembly jig after aligning the positioning hole of the air-core coil with the center pin; and mounting both the FPC and the air-core coil to the base.

Further, in the vibration generator producing method of the present invention, when the base is a circuit board member comprising a PCB and the air-core coil is mounted to the circuit board member, the second assembling process may include: seating a positioning hole of the circuit board member on a center pin of an assembly jig after aligning the positioning hole of the circuit board member with the center pin; seating a positioning hole of the air-core coil on the center pin of the assembly jig after aligning the positioning hole of the air-core coil with the center pin; mounting the air-core coil to the circuit board member; and electrically connecting the circuit board member and the air-core coil to each other.

Further, in the third assembling process of the vibration generator producing method of the present invention, a process of assembling the first assembly of the first assembling process with the second assembly of the second assembling process with each other may comprise: assembling the casing and the base with each other by an engagement method by forming a plurality of 凹-shaped parts or a plurality of 凸-shaped parts on an outer circumferential edge of the casing and by forming 凸-shaped parts or 凹-shaped parts on an outer circumferential edge of the base.

Further, in the vibration generator producing method of the present invention, when the base is a circuit board member comprising a PCB, the casing and the circuit board member may be mounted to each other by soldering or caulking after assembling the casing and the circuit board member with each other by an engagement method.

Advantageous Effects

As described above, the vibration generator according to the present invention includes a casing that is open on one side thereof, a vibration part having a weight provided inside the casing, and a spring mounted inside the casing, and can produce horizontal vibration using the phenomenon of resonance that occurs by causing oscillation in an electromagnetic force having the same frequency as the intrinsic vibration frequency of the spring, thereby increasing the expected life span of the vibration generator and generating a large vibration force despite having a thin construction.

Further, the present invention improves the construction of the vibration generator in such a way that a circuit board member is mounted to a lower part of the casing, thereby allowing a surface mounting technology to be adapted and manufacturing of the vibration generators to be performed by an automated process, and the present invention uses no additional lead wires, thereby realizing improved connection reliability and enabling easier and more efficient application of the vibration generators to devices.

Further, the method of producing the vibration generators according to the present invention can reduce the assembly allowance of assembled parts and can improve assembly efficiency, thereby improving reliability of products and reducing the production cost.

BRIEF DESCRIPTION OF DRAWINGS

FIG. 11 is a view illustrating a completely assembled state of the second embodiment of the vibration generator according to the present invention, in which FIG. 11(a) is a front perspective view, and FIG. 11(b) is a rear perspective view;

FIG. 12 is a detailed view of a base (circuit board member) of the second embodiment of the vibration generator according to the present invention shown in FIG. 6, in which FIG. 12(a) is a front perspective view, and FIG. 12(b) is a rear perspective view;

Figure 1:
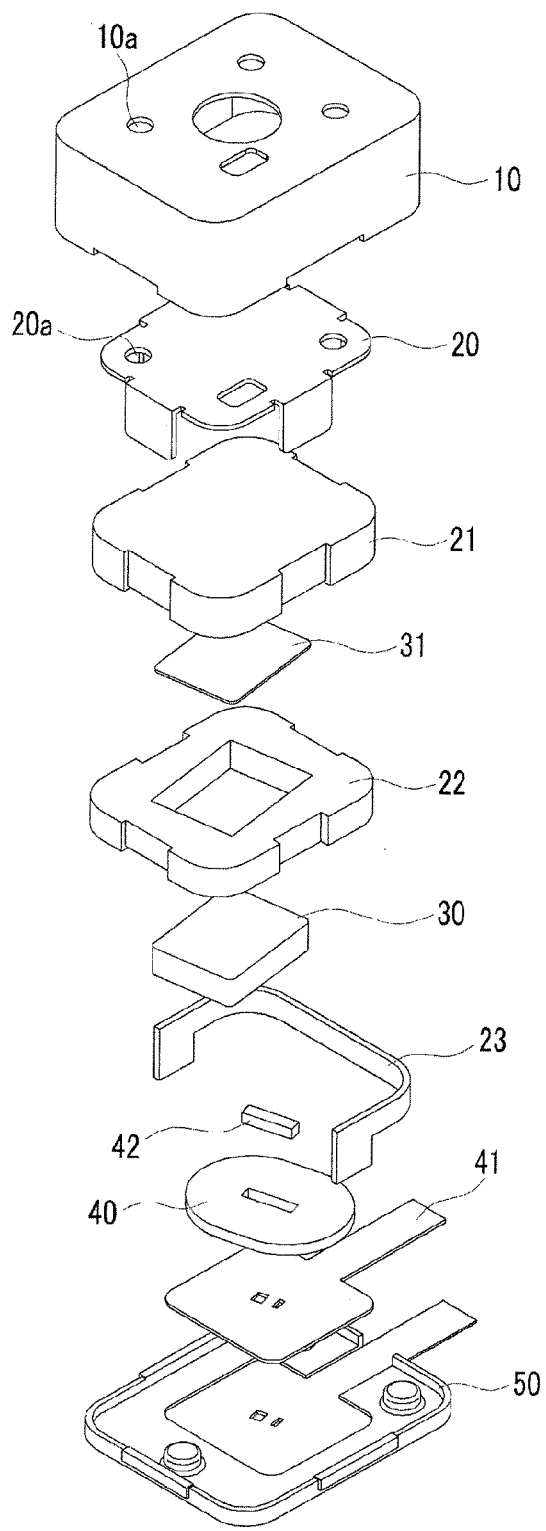
FIG. 1 is an exploded perspective view of a first embodiment of a vibration generator according to the present invention.

| *Description of Reference Numerals* | |
|---|---|
| 10: casing | 10a, 20a: positioning hole |
| 11: assembling notch | 20: bracket |
| 21: first weight | 22: second weight |
| 23: spring | 30: magnet |
| 31: yoke | 40: air-core coil |
| 40a, 41a, 50a: positioning hole | |
| 41: FPC | 42: core |
| 50: base (circuit board member) | |
| 51: assembling protrusion | |
| 52: circular protrusion | |
| 53: half blanking part | 54: outer connection means |
| 55: contact part | |
| 56: air-core coil connection means | |
| 57: grounding means | |

DETAILED DESCRIPTION OF EMBODIMENTS OF INVENTION

Hereinbelow, a vibration generator and a method of producing the vibration generator according to the present invention will be described in detail with reference to the accompanying drawings.

As shown in the drawings, the vibration generator according to the present invention includes: a casing 10 that has a square box shape formed by four sidewalls, one open surface and one closed surface, with a space defined inside the casing; a bracket 20 that has a rectangular bottom surface and sidewalls standing upright from four edges of the rectangular bottom surface and having a predetermined width, the bracket being placed inside the casing and providing a predetermined space in the casing; a vibration part having weights 21 and 22 placed inside the bracket 20; a U-shaped spring 23 that is mounted both to the casing 10 and to the bracket 20 in a state in which the spring surrounds the bracket 20; a magnetic field generating part which includes a magnet 30 that generates an electromagnetic force so as to cause the vibration part to horizontally vibrate and an air-core coil 40 that is placed in such a way that the coil is spaced apart from the magnet 30 by a predetermined gap; and a base 50 that is assembled so as to close the open surface of the casing 10.

Figure 7:
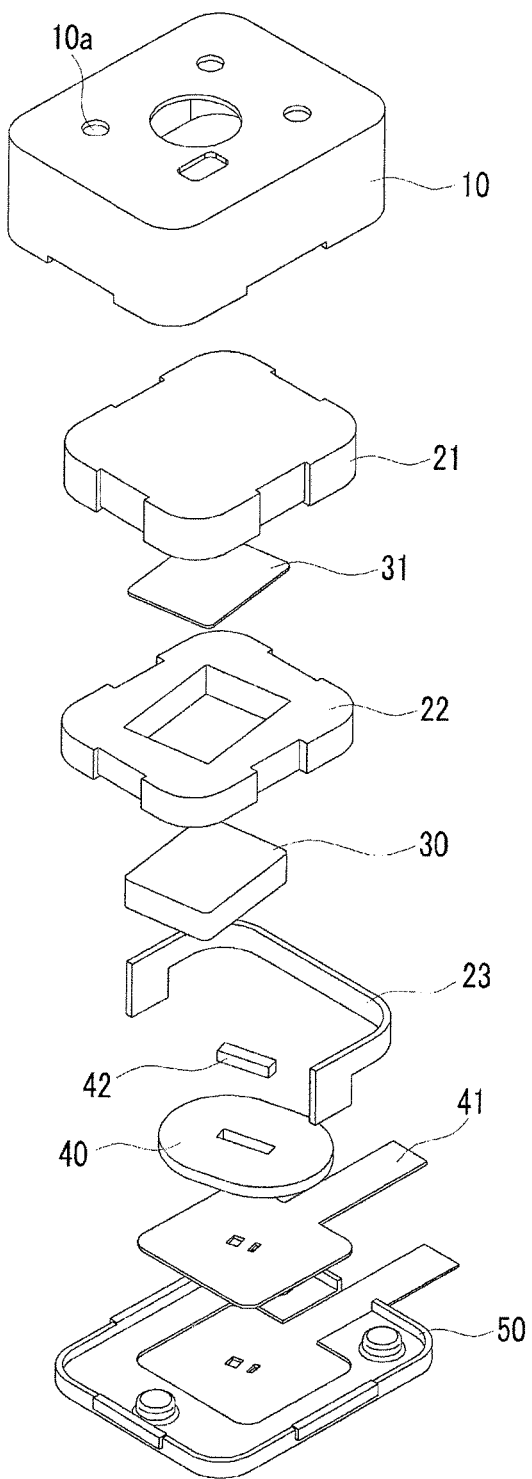
FIG. 7 is an exploded perspective view of a modification of the first embodiment of the vibration generator according to the present invention.
Figure 8:
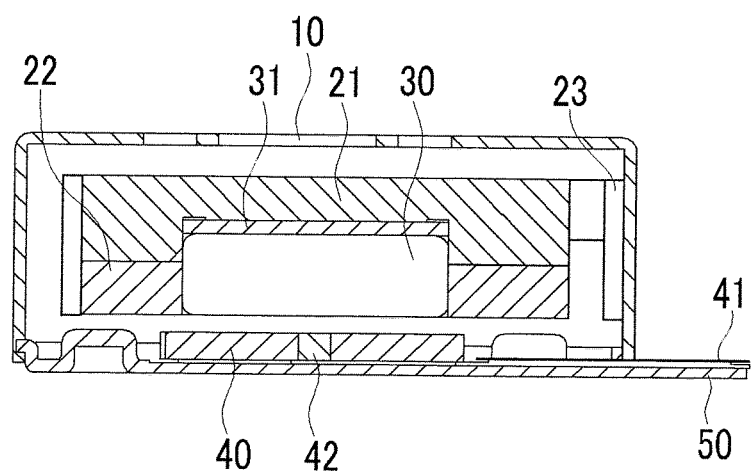
FIG. 8 is a sectional view of the modification of the first embodiment of the vibration generator according to the present invention.

As shown in FIG. 7 and FIG. 8, the vibration generator according to the present invention may be configured such that no bracket 20 is placed inside the casing 10, but the spring 23 can support the weights 21 and 22 by mounting a first end of the spring 23 to the casing and by directly mounting a second end thereof to the weights 21 and 22 in a state in which the spring surrounds the weights 21 and 22 in a U-shaped form.

The weights include a first weight 21 having a depression and a second weight 22 having an opening. Here, the magnet 30 is seated in the depression of the first weight 21 and is inserted into the opening of the second weight 22, with a metal yoke 31 interposed between the magnet and the first weight.

The yoke 31 is attached to one surface of the magnet 30 and functions as a line through which the line of magnetic force that is produced by the N-pole of the magnet 30 passes from the N-pole to the S-pole. Here, because the yoke 31 is attached to only one surface of the magnet 30 as described above, the magnetic force of an opposite surface of the magnet on which no yoke 31 is attached can be increased. When the magnetic field that is produced by the air-core coil 40 meets the magnetic field that is produced by the surface of the magnet 30 on which no yoke 31 is attached, a higher magnetic force can be produced.

Figure 2:
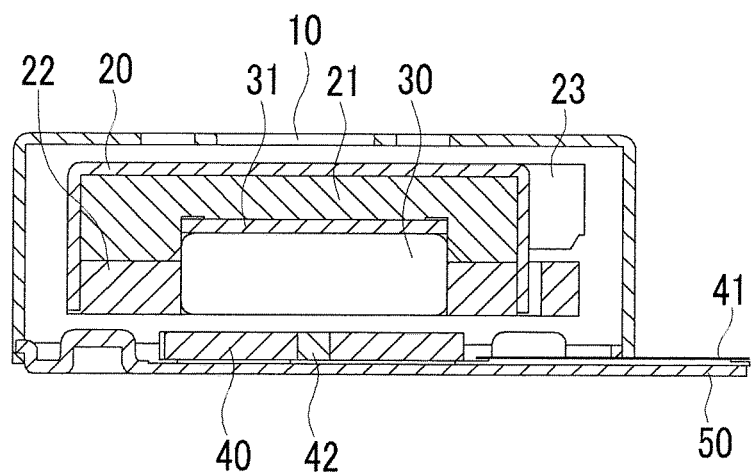
FIG. 2 is a sectional view of the first embodiment of the vibration generator according to the present invention.
Figure 3:
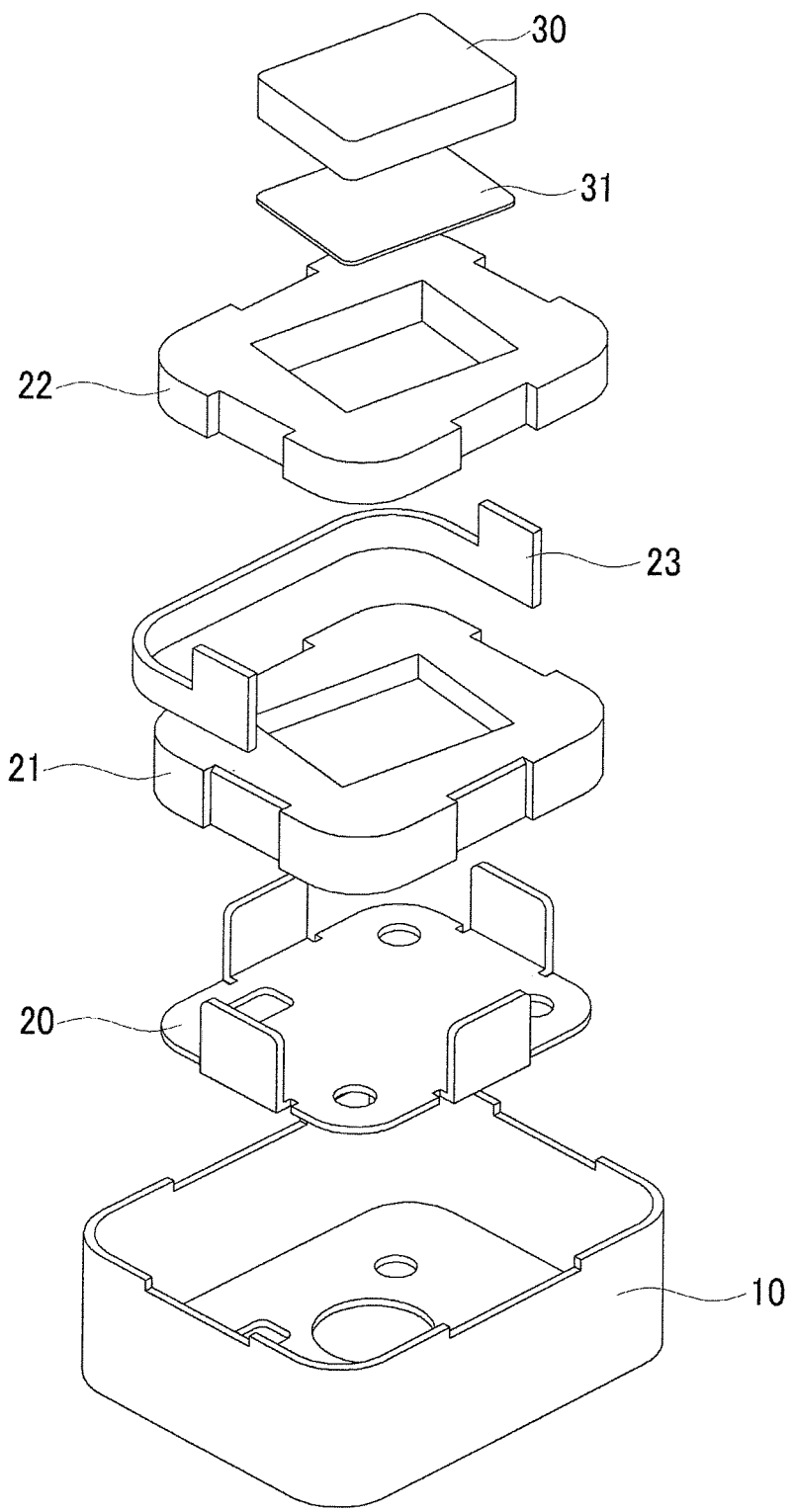
FIG. 3 is an exploded perspective view of a vibration part of the vibration generator according to the present invention.

Each of the weights 21 and 22 has a predetermined weight. For realizing easy production of the weights, it is preferred that the weights comprise two weights, which are the first weight 21 and the second weight 22, as shown in FIGS. 1 to 3. However, the vibration generator of the present invention may be configured such that both the yoke 31 and the magnet 30 can be held using one weight. The weights are made of a metal having a high specific gravity. Here, it is preferred that the weights be made of a nonmagnetic tungsten alloy that has a specific gravity of not less than 16.

Figure 5:
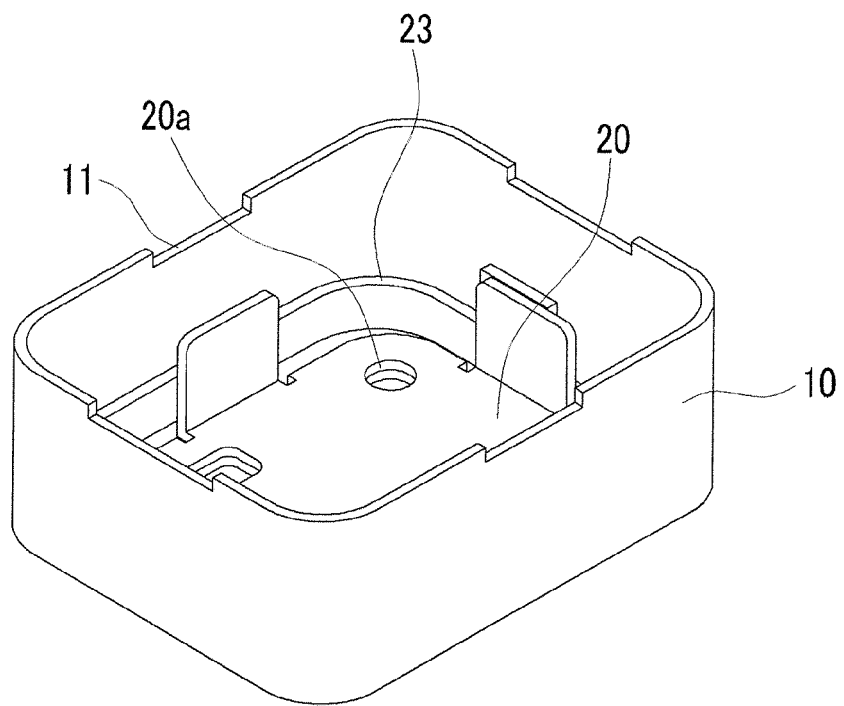
FIG. 5 is a detailed view illustrating assembling protrusions of a casing and a cover part of the vibration generator according to the present invention.

As an embodiment, the spring 23 may be configured such that the spring is mounted to a surface of the casing 10 at a first end thereof and is mounted to a surface of the bracket 20 at a second end in a state in which the spring surrounds the weights 21 and 22 in a U-shaped form, as shown in FIG. 5. As another embodiment, the spring 23 may be configured such that the spring is mounted to the surface of the casing 10 at the first end thereof and is directly mounted to the weights at the second end, as shown in FIG. 8.

In other words, to form the structure for holding the weights in the casing 10 of the vibration generator according to the present invention, an embodiment of the weight holding structure may be realized both by the vibration part having the weights 21 and 22 placed in the bracket 20 and by the U-shaped spring 23 that is mounted to both the casing 10 and the bracket 20 in a state in which the spring surrounds the bracket 20, in which the magnet 30 is placed in an inner space of the weights 21 and 22 so that the magnet 30 can vibrate to the left and right by the U-shaped spring 23. As another embodiment, the weight holding structure may be realized both by mounting the first end of the spring 23 to the casing 10 and by directly mounting the second end of the spring to the weights 21 and 22 in a state in which the spring 23 surrounds the weights 21 and 22 without using the bracket 20, in which the magnet 30 is placed in the inner space of the weights 21 and 22 so that the magnet 30 can vibrate to the left and right by the U-shaped spring 23.

When the magnet 30, which is installed in the inner space of the weights 21 and 22 that may be placed in the inner space of the bracket 20 or may be directly held by the spring 23, vibrates to the left and right by the magnetic force produced by the magnetic field generating part, the spring 23 also elastically vibrates to the left and right. That is, when the weights 21 and 22 are placed in the inner space of the bracket 20 and the magnet vibrates to the left and right, the bracket 20 vibrates to the left and right and the spring 23 that is mounted to the bracket 20 at the second end thereof elastically vibrates to the left and right.

Here, the magnet 30 is a magnet made of an Nd—Fe—B sintered body, in which the magnet is magnetized at two poles (N-pole and S-pole) on the left and the right.

Further, in the vibration generator according to the present invention, the base 50 that is assembled to the vibration generator so as to close the open surface of the casing 10 may be formed by mounting an FPC (Flexible Printed Circuit) to the base (first embodiment), as shown in FIGS. 1, 2, 4 and 6 to 8. Alternatively, the base 50 may be formed by mounting a PCB (Printed Circuit Board) to the base 50 (second embodiment), as shown in FIGS. 9 to 12.

Figure 4:
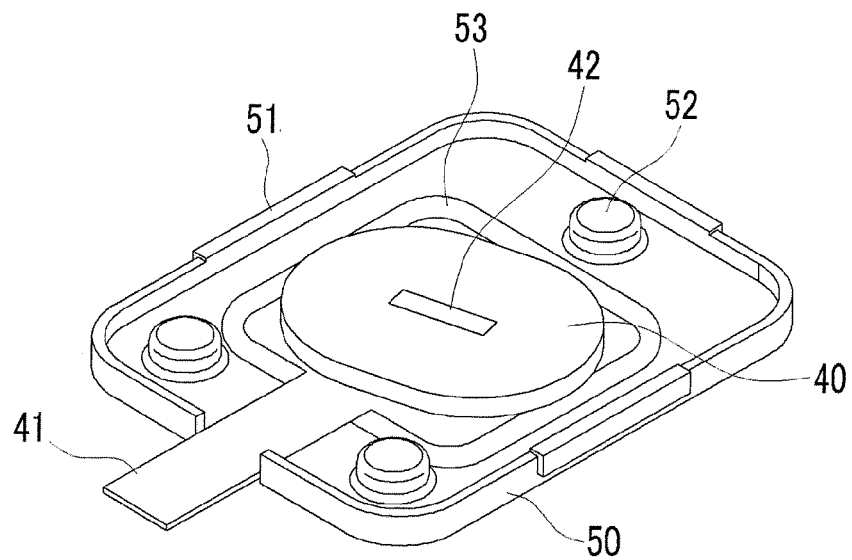
FIG. 4 is a detailed view of a base part of the first embodiment of the vibration generator according to the present invention.
Figure 6:
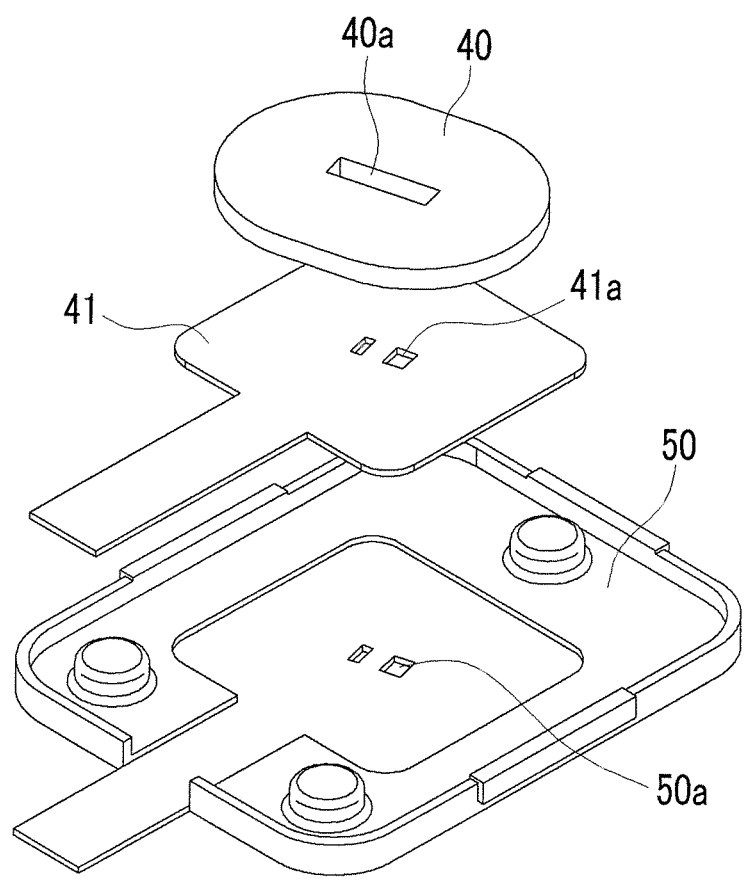
FIG. 6 is a detailed view illustrating a combination of the base part in the first embodiment of the vibration generator according to the present invention.

In the first embodiment, as shown in FIGS. 4 to 6, an FPC (Flexible Printed Circuit) 41 having a circuit pattern is mounted to the upper surface of the base 50 (a surface facing the interior of the casing when assembled), and an air-core coil 40 in which a core 42 is installed or in which no core 42 is installed is mounted to the upper surface of the FPC 41.

In the second embodiment, as shown in FIGS. 9 to 12, the base is formed by a circuit board member 50 that is integrated with a PCB (Printed Circuit Board). Here, the circuit board member 50 is electrically connected to the air-core coil 40 and holds the air-core coil 40 so that, when external electric power is supplied to the circuit board member 50, the circuit board member 50 outputs a predetermined electric signal so as to allow the air-core coil 40 to produce a predetermined magnetic field. The circuit board member 50 has a structure that can be mounted to the open surface of the casing 10.

Figure 12:
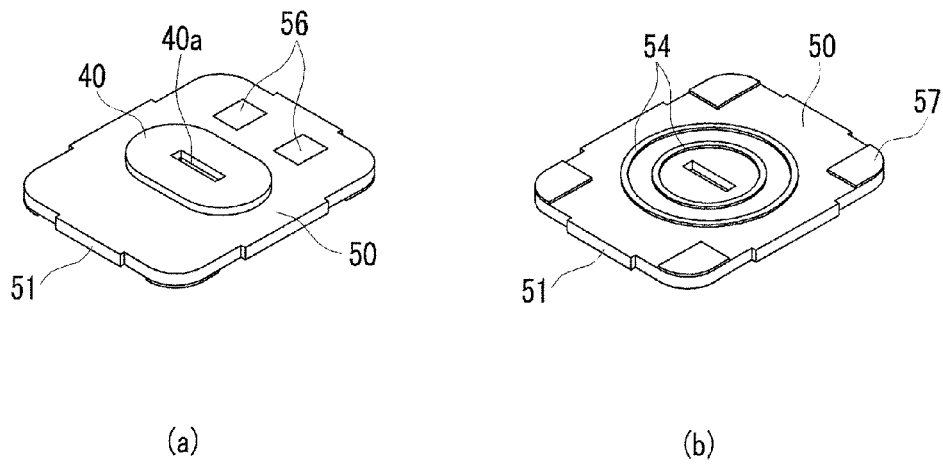

As shown in FIG. 12, the circuit board member 50 is provided on a first surface thereof with an air-core coil connection means 56, through which the circuit board member 50 can be electrically connected to the air-core coil 40. The circuit board member 50 is also provided on a second surface thereof with an outer connection means 54 through which external electric power can be supplied to the circuit board member 50. Here, both the air-core coil connection means 56 and the outer connection means 54 are electrically connected to a circuit of the circuit board member.

In the present invention, the connection means including both the air-core coil connection means 56 and the outer connection means 54 may be formed by attaching metal pieces to opposite surfaces of the circuit board member 50. Alternatively, the connection means may be formed by patterning a conductive pattern on a surface of the circuit board member.

Further, to ground the vibration generator, the circuit board member 50 is provided on the second surface thereof with a grounding means 57. The grounding means 57 may be formed by attaching a metal piece to the circuit board member or by patterning a conductive pattern on the circuit board member.

When the vibration generator according to the present invention is installed in a device such as a mobile phone, the grounding means 57 functions to allow the vibration generator to come into efficient contact with a PCB of the device such as the mobile phone and to be firmly held in the device.

Here, it is preferred to use a PCB (Printed Circuit Board) as the circuit board member 50 and it is preferred that the PCB be formed as a dual layer PCT. The dual layer PCB is a PCT in which different circuit patterns are formed on upper and lower surfaces of one PCB. In the dual layer PCB, the circuit patterns that are formed on the upper and lower surfaces are electrically connected to each other so that, when external electric power is applied to the circuit pattern of the lower surface of the PCT, the circuit pattern of the upper surface can be electrically activated. When a dual layer PCT is used as the circuit board member 50 of the present invention, the air-core coil 40 can be installed in the upper surface of the PCB. Further, the air-core coil 40 in the above case can be electrically activated by applying external electric power to the circuit pattern of the lower surface of the PCB without using a wire.

Further, the circuit board member 50 may be configured such that it can be formed using a surface mounting technology (SMT). In this case, the circuit of the circuit board member 50 can be formed using the surface mounting technology.

In the air-core coil 40, an inner space is formed, in which a core 42 may be installed in the inner space or in which no core 42 may be installed in the inner space.

The core 42 that is installed in the inner space of the air-core coil 40 is made of metal having high magnetic permeability and has a height that is equal to or greater than the height of the air-core coil 40. When a core 42 having high magnetic permeability is used in the vibration generator as described above, the vibration generator is advantageous in that the amount of leaking magnetic field can be reduced.

The air-core coil 40 is formed by winding using a self bonding wire that has a circular cross-section or a square cross-section.

In the above-mentioned construction, the theory in which the vibration part vibrates to the left and right and generates vibration will be described hereinbelow.

When external electric power is applied to the air-core coil 40 through the FPC 41 or through the circuit board member 50, an electric current flows through the air-core coil 40 so that a magnetic field is formed around the air-core coil 40. Further, when the core 42 is installed in the air-core coil 40, the magnetic field produced by the Ampere's law can be concentrated to the core 42 having high magnetic permeability.

Here, the magnet 30 is magnetized at an N-pole and an S-pole on the left and the right, so that the magnetic field produced by the magnet 30 and the magnetic field produced around the air-core coil 40 or the magnetic field concentrated to the core 42 when the core 42 is installed mutually interact according to the Lorentz force law and the magnet 30 vibrates to the left and right by the U-shaped spring 23. In the above case, the weights 21 and 22 in which the magnet 30 is securely installed also vibrates to the left and right.

Here, when the frequency of the electric power that is applied to the air-core coil 40 through the FPC 41 or through the circuit board member 50 is controlled to be equal to the intrinsic frequency of the spring 23, the phenomenon of resonance in which the intensity of vibration is rapidly increased can be produced so that maximum vibration can be obtained.

The resonance frequency that can produce resonance can be calculated using the frequency of applied electric power as follows:

$$\text{resonance frequency} = 1/2\pi\sqrt{(k/m)}$$

wherein, k=spring constant, m=mass of weight

Here, the resonance frequency can be determined by changing both the spring constant of the spring 23 and the mass of the weights 21 and 22 according to a frequency used in designing. The resonance frequency may be changed according to designers.

The vibration generator according to the present invention uses the above-mentioned phenomenon of resonance, in which the metal core 42 having high magnetic permeability is installed in the air-core coil 40 so that the core can reduce a leakage of magnetic field. Further, the magnet 30 that is magnetized at N-pole and S-pole on the left and the right is placed in such a way that the magnet is spaced apart from the air-core coil 40 by a predetermined distance so that, when external electric power is applied to the air-core coil 40 through the FPC 41 or through the circuit board member 50, an electric current flows through the air-core coil 40 and a magnetic field is formed around the air-core coil 40. Accordingly, the magnet 30 vibrates to the left and right and the weights 21 and 22 vibrate to the left and right, so that both the bracket 20 that holds the weights 21 and 22, and the spring 23 that is mounted in the bracket can vibrate to the left and right. As described above, the present invention uses the phenomenon of resonance of the spring 23 so that the present invention can solve the mechanical problems experienced in the vertical movement of the related art vertical moving type vibration generators, and provides a vibration generator that can generate a large vibration force despite having a thin construction.

Further, the directions of magnetic fields that are produced both by the air-core coil 40 and by the magnet 30 can be changed to desired directions by controlling the orientation of both the air-core coil 40 and the magnet 30, so that the phenomenon of resonance can be produced in various specified bands of frequencies.

In the vibration generator according to the present invention, the assembly, in which the spring 23 is mounted at the first end thereof to the casing 10 and is mounted at the second end thereof to the bracket 20, both the first weight 21 and the second weight 22 are installed in the inner space of the bracket 20, and both the yoke 31 and the magnet 30 are installed in the inner space of both the first weight 21 and the second weight 22, is called a first assembly. Further, in the first embodiment, the assembly in which the air-core coil 40 having both the FPC 41 and the core 42 is mounted to the base 50 is called a second assembly. However, in the second embodiment, the assembly in which the air-core coil 40 is mounted to the circuit board member 50 and the circuit board member 50 is electrically connected to the air-core coil 40 is called a second assembly. When the first assembly and the second assembly are assembled with each other by an engagement of engagement parts after forming the first and second assemblies, the vibration generator of the present invention is produced.

Figure 10:
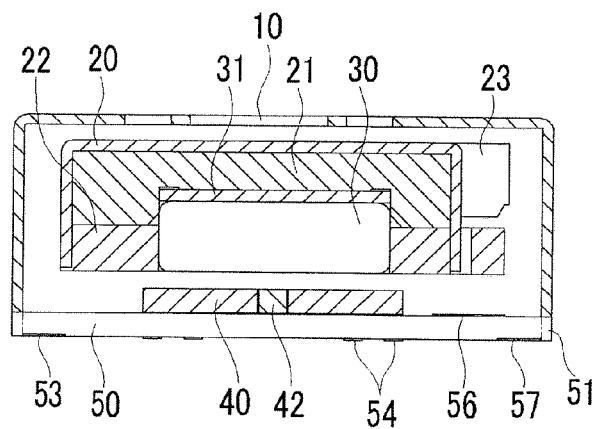
FIG. 10 is a sectional view of the second embodiment of the vibration generator according to the present invention.
Figure 11:
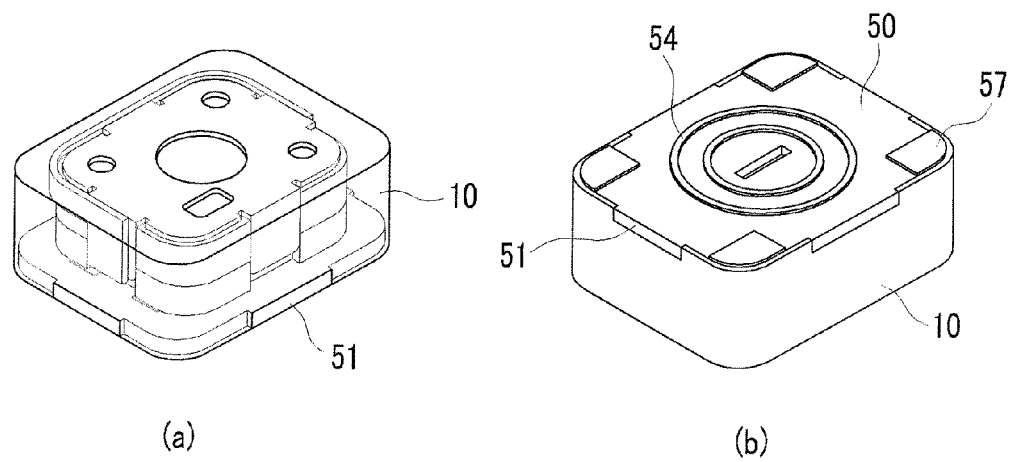

In other words, a plurality of assembling notches (凹-shaped parts) 11 may be formed on the outer circumferential edge of the open surface of the casing 10 as shown in FIG. 5, and a plurality of assembling protrusions (凸-shaped parts) 51 may be formed on the outer circumferential edge of the base 50 as shown in FIG. 4 (first embodiment). Alternatively, as shown in FIGS. 10 and 12, a plurality of assembling notches (凹-shaped parts) 11 may be formed on the end of the open surface of the casing 10 or on the outer circumferential edge of the open surface of the casing 10, and a plurality of assembling protrusions (凸-shaped parts) 51 may be formed on the outer circumferential edge of the circuit board member 50 at locations corresponding to the assembling notches 11 (second embodiment). Thereafter, the assembling notches 11 of the casing 10 are engaged with the assembling protrusions 51 of the circuit board member 50 so that the circuit board member 50 can be mounted to the open surface of the casing 10.

Here, the assembling notches 11 and the assembling protrusions 51 may be formed as assembling protrusions (凸-shaped parts) and assembling notches (凹-shaped parts), respectively, so that the casing 10 and the base 50 can be assembled with each other by an engagement of the assembling protrusions with the assembling notches.

In the second embodiment, the depth of the engagement parts (assembling notches 11) that are formed on the outer circumferential edge of the casing 10 may be determined to be equal to or less than the thickness of the circuit board member 50. Further, the circuit board member 50 is provided along an outer circumferential surface thereof or along a thickness surface thereof with a contact part 55. The contact part 55 is plated with a conductive material and comes into contact with the inner circumferential surface of the casing 10 when the circuit board member 50 is mounted to the open surface of the casing 10, so that the circuit board member 50 can be electrically connected to the casing 10 made of a conductive material.

As described above, because the contact part 55 of the circuit board member 50, on which the circuit board member 50 comes into contact with the inner circumferential surface of the casing 10, is plated with a conductive material, it is possible to overcome the problems such as difficulty in laser welding caused by a metal material of the contact part 55 of the circuit board member 50. Further, soldering can be used to weld the circuit board member 50 to the casing 10 so that firm mounting of the circuit board member 50 to the casing 10 can be realized.

Further, when the circuit board member 50 is mounted to the open surface of the casing 10, a predetermined gap (not shown) remains between the circuit board member 50 and the inner circumferential surface of the casing 10, and solder is applied to the above-mentioned gap (not shown) so that the circuit board member 50 can be firmly mounted to the casing 10. Here, the casing 10 is required to be made of a solderable material that can be efficiently soldered.

A plurality of positioning holes 10*a* are formed in the casing 10 so as to allow a worker to easily view the installing position of the bracket 20 relative to the casing when the bracket 20 is installed in the casing 10. Further, a plurality of positioning holes 20*a* are formed in the bracket 20 at locations corresponding to the positioning holes 10*a*.

The mounting of both the FPC 41 and the air-core coil 40 to the base 50 in the first embodiment will be described in detail hereinbelow. To realize the precise mounting of both the FPC 41 and the air-core coil 40 to the base 50 at predetermined locations, the inner space of the air-core coil 40, in which the core 42 is installed, is used as a positioning hole 40*a*, and respective positioning holes 41*a*, 50*a* are formed in the FPC 41 and in the base 50 at locations corresponding to the positioning hole 40*a* of the air-core coil 40 (see FIG. 6). Further, a half blanking part 53 having a depression of a predetermined size is formed in the base 50, and the FPC 41 is mounted in the half blanking part 53, so that the number of protruding portions remaining in the assembly can be minimized, or so that no protruding portions at all remain in the assembly after the FPC 41 is mounted to the base 50. Further, the base 50 is preferably provided with a plurality of dome-shaped circular protrusions 52 at predetermined locations around the half blanking part 53.

The circular protrusions 52 function as bumpers. That is, the bracket 20 that holds the weights 21 and 22 therein is held by the U-shaped spring 23 so that, when a device such as a mobile phone in which the vibration generator according to the present invention is installed is dropped during a drop test or is carelessly dropped, the weights 21 and 22 may be undesirably moved in a dropped direction. In the vibration generator, the air-core coil 40 is placed below the weights 21 and 22 so that, when the weights 21 and 22 are moved in the dropped direction as described above, the weights 21 and 22 may strike the air-core coil 40 placed below them and this may impact upon the air-core coil 40 or may cause a short circuit in the air-core coil 40, thereby deteriorating the quality of the air-core coil 40. However, the present invention can efficiently protect the air-core coil 40 in the above state by providing the circular protrusions 52.

In other words, even when the weights 21 and 22 are moved downward during a drop test, the weights 21 and 22 are bumped against the dome-shaped circular protrusions 52 that are formed at the predetermined locations around the half blanking part 53 of the base 50, and so the circular protrusions 52 can function as bumpers capable of preventing the weights 21 and 22 from coming into contact with the air-core coil 40.

In the present invention, to prevent the weights 21 and 22 from coming into contact with the air-core coil 40 even when the weights 21 and 22 are moved in any directions during a drop test, it is preferred that a plurality of circular protrusions 52 (in the drawings, three circular protrusions are shown) be formed on the base.

Figure 9:
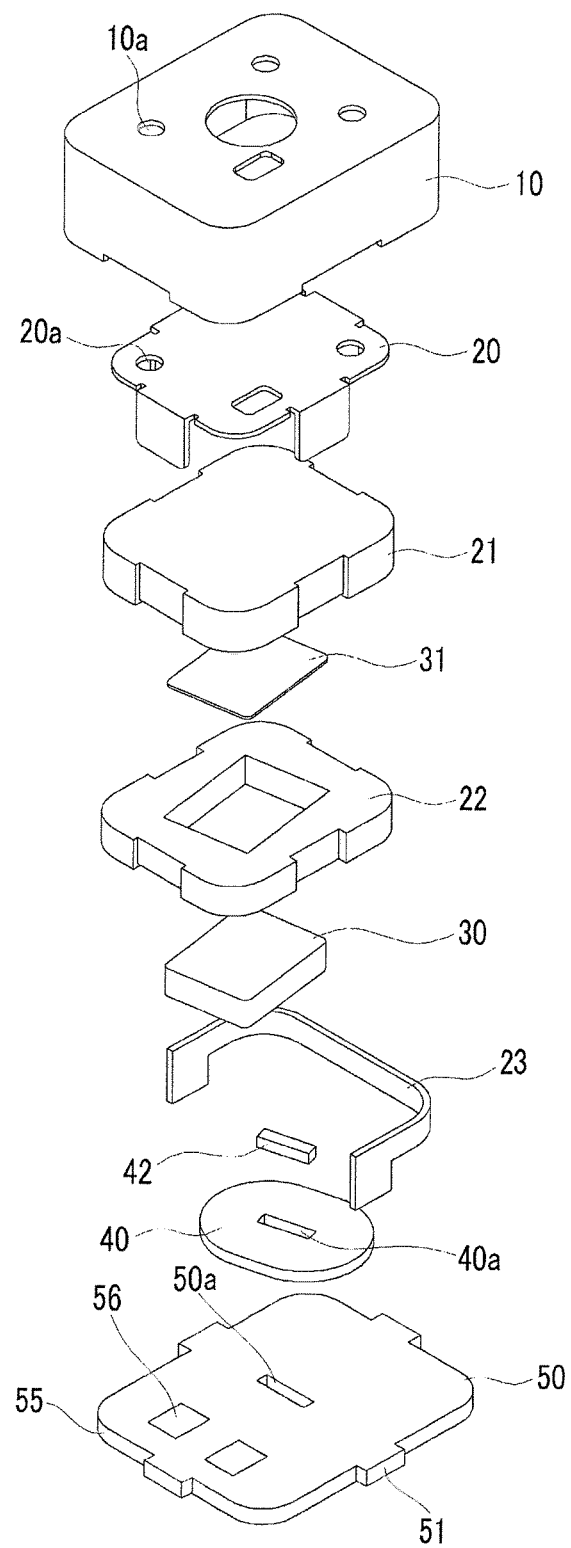
FIG. 9 is an exploded perspective view of a second embodiment of the vibration generator according to the present invention.

Hereinbelow, the mounting of the air-core coil 40 to the circuit board member 50 in the second embodiment will be described in detail. To realize the precise mounting of the air-core coil 40 to the circuit board member 50 at a predetermined location, as shown in FIG. 9, the inner space of the air-core coil 40 in which the core 42 is installed is used as a positioning hole 40*a* and another positioning hole 50*a* is formed in the circuit board member 50 at a location corresponding to the positioning hole 40*a*. Here, the positioning hole 40*a* is formed by the inner space that functions as the core of the air-core coil, and the positioning hole 50*a* is configured to have a shape almost similar to the shape of the core of the air-core coil.

Hereinbelow, the method of producing the vibration generator according to the present invention will be described in detail with reference to the accompanying drawings.

The vibration generator having the above-mentioned construction according to the present invention is a small-sized product, so the parts of the small-sized vibration generator are also small-sized parts. Accordingly, the operational performance of the small-sized vibration generator is greatly affected by the positional allowance of the parts during a process of producing the vibration generator. Further because the parts are small-sized parts, it is difficult to realize desired assembly work efficiency and so it is required to solve the problems experienced in the difficult assembly work.

To this end, the method of producing the vibration generator according to the present invention uses positioning holes in an effort to realize easy assembly of respective parts and to realize an easy process.

Figure 13:
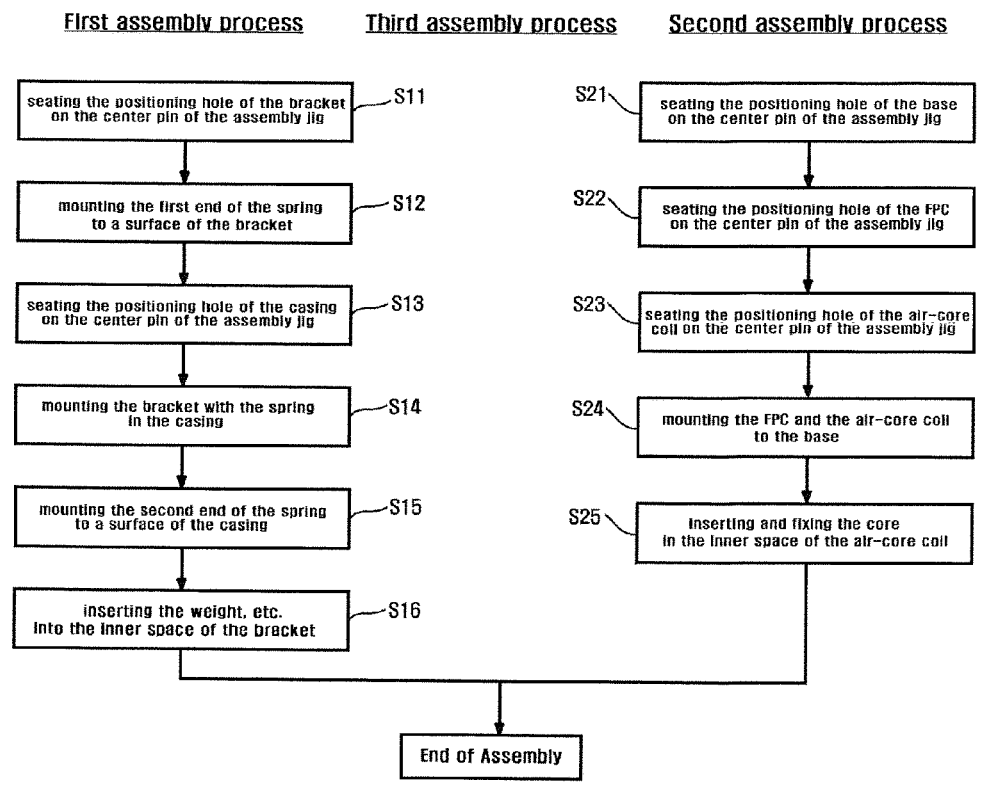
FIG. 13 is a flowchart of a method of producing the first embodiment of the vibration generator according to the present invention.

As shown in FIG. 13, the method of producing the vibration generator according to the present invention (first embodiment) is divided into separate processes that comprise: a first assembling process, in which the weights and the magnet 30 are installed in the inner space of the bracket 20 after mounting the U-shaped spring 23 both to the bracket 20 and to the casing 10, and a second assembling process which is processed separately from the first assembling process and in which both the FPC 41 and the air-core coil 40 are mounted to the base 50. After finishing the first and second assembling processes, a third assembling process is performed, in which a first assembly produced by the first assembling process and a second assembly produced by the second assembling process are assembled with each other into a vibration generator.

Figure 14:
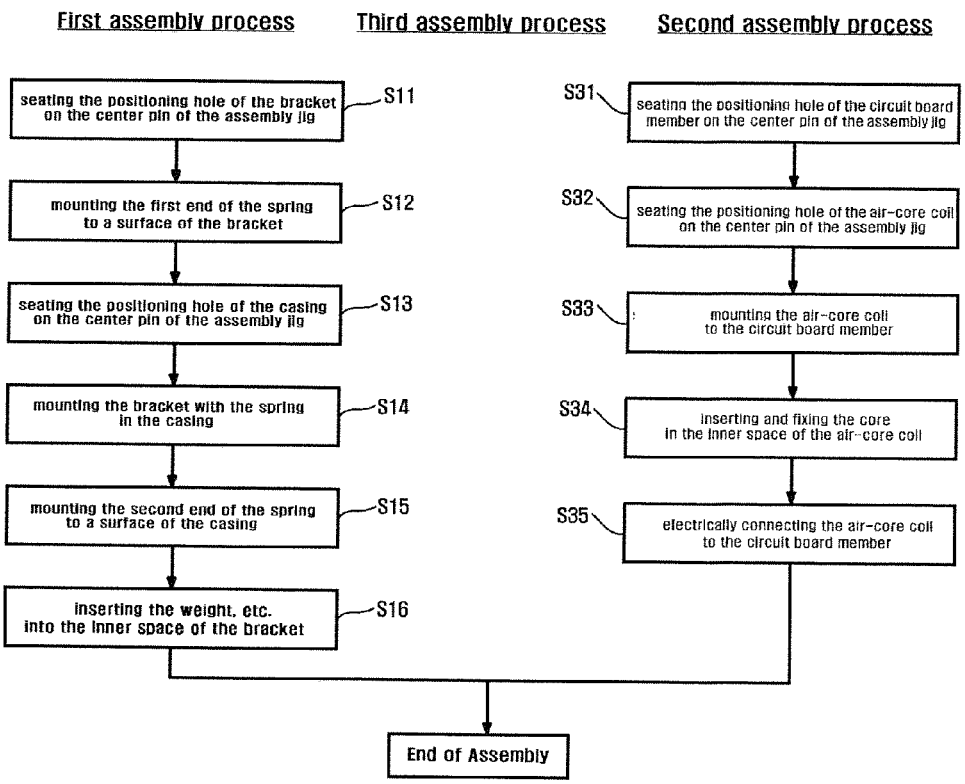
FIG. 14 is a flowchart of a method of producing the second embodiment (in the case of using a circuit board member as the base) of the vibration generator according to the present invention.
Figure 15:
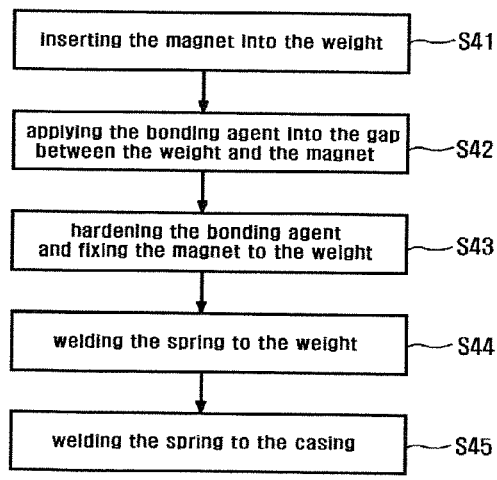
FIG. 15 is a flowchart of another embodiment of a first process of the method of producing the vibration generator according to the present invention.

As shown in FIG. 14, the method of producing the vibration generator according to the present invention (second embodiment) is divided into separate processes that comprise: a first assembling process in which both the weights and the magnet 30 are installed in the inner space of the bracket 20 after mounting the U-shaped spring 23 both to the bracket 20 and to the casing 10, and a second assembling process which is processed separately from the first assembling process and in which the air-core coil 40 is assembled in the circuit board member 50 (second assembly). After finishing the first and second assembling processes, a third assembling process is performed, in which a first assembly produced by the first assembling process and a second assembly produced by the second assembling process are assembled with each other into a vibration generator.

In the first assembling process, the weight may be formed using one weight. Alternatively, the weight in the first assembling process may comprise the first weight 21 having a depression and the second weight 22 having an opening, and the magnet 30 may be installed by being seated in the depression of the first weight 21 and by being inserted into the opening of the second weight 22, with an interposition of the magnetic yoke 31. Here, when the bracket 20 is made of a magnetic material, the yoke 31 may be omitted.

First, the first assembling process (the process in which the weight comprises the first weight 21 and the second weight 22, and the yoke 31 is installed) will be described. The first assembling process comprises: seating the positioning holes 20a of the bracket 20 on the center pin of an assembly jig (step S11), mounting a first end of the U-shaped spring 23 to a surface of the bracket 20 (step S12) so that the U-shaped spring 23 is mounted to the bracket 20, aligning and seating the positioning holes 10a of the casing 10 with and on the center pin of a casing assembly jig (step S13), seating the bracket 20 having the spring 23 mounted thereto in the casing 10 (step S14), mounting a second end of the spring 23 mounted to the bracket 20 to a surface of the casing 10 (step S15), and sequentially inserting the first weight 21, the yoke 31, the magnet 30 and the second weight 22 in the inner space of the bracket 20 (step S16), thereby producing the first assembly.

Here, it is preferred that the first weight 21, the yoke 31, the magnet 30 and the second weight 22 that are inserted in the inner space of the bracket 20 be inserted into and secured to the inner space of the bracket.

In the first assembling process, when the weight comprises one weight and no yoke 31 is installed, an opening is formed in the weight and the magnet 30 is installed in the opening of the weight.

Further, in the method of producing the vibration generator according to the present invention, a modification of the first assembling process, in which a vibration generator having no bracket 20 is produced, may be processed such that the magnet 30 is inserted into the weight and the weight is mounted to the spring 23, and the spring 23 is mounted to the casing, as shown in FIG. 10.

The first assembling process for producing the vibration generator having no bracket 20 will be described in detail as follows with reference to FIG. 10.

The first assembling process for producing the vibration generator having no bracket 20 comprises: inserting the magnet 30 into the weight (step S41), applying a bonding agent to a gap between the weight and the magnet 30 so as to fix the magnet 30 and the weight (step S42), fixing both the weight and the magnet 30 by hardening the bonding agent applied to the gap between the magnet 30 and the weight (step S43), mounting the magnet 30 and the weight to the spring 23 through welding, etc. (step S44), and mounting the spring 23 having the weight mounted thereto to the casing through welding, etc. (step S45), thereby finishing the first assembling process.

Hereinbelow, the second assembling process that is processed separately from the first assembling process will be described in detail. In the first embodiment, the second assembling process comprises: seating the positioning hole 50a of the base 50 on the center pin of a base assembly jig (step S21), seating the positioning hole 41a of the FPC 41 on the center pin of the base assembly jig (step S22), seating the positioning hole 40a of the air-core coil 40 on the center pin of the base assembly jig (step S23), mounting both the FPC and the air-core coil to the base (step S24), and inserting and fixing the core 42 in the inner space of the air-core coil 40 or in the positioning hole 40a of the air-core coil 40 (step S25), thereby producing the second assembly.

Further, the second assembling process of the second embodiment comprises: seating the positioning hole 50a of the circuit board member 50 on the center pin of an assembly jig (step S31), seating the positioning hole 40a of the air-core coil 40 on the center pin of the assembly jig (step S32), mounting the air-core coil 40 to the circuit board member 50 (step S33), inserting and fixing the core 42 in the inner space of the air-core coil 40 or in the positioning hole 40a of the air-core coil 40 (step S34), electrically connecting the circuit board member 50 and the air-core coil 40 to each other (step S35), thereby producing the second assembly. Here, no core 42 may be used in the air-core coil 40. When no core 42 is used in the air-core coil 40 as described above, the step S34 is omitted from the process. Here, the method of mounting the air-core coil 40 to the circuit board member 50 may be realized using a bonding agent. Further, the air-core coil 40 may be electrically connected to the circuit board member 50 through soldering.

In the process in which the first assembly produced by the first assembling process and the second assembly produced by the second assembling process are assembled with each other, the plurality of assembling notches (凹-shaped parts) 11 are formed on the outer circumferential edge of the open surface of the casing 10 and the assembling protrusions (凸-shaped parts) 51 are formed on the outer circumferential edge of the base 50 so that the casing 10 and the base 50 can be easily assembled with each other by an engagement of the assembling notches 11 with the assembling protrusions 51.

As described above, the positioning holes 10a and 20a are formed in the casing 10 and in the bracket 20 at corresponding locations so that the two parts can be precisely assembled with each other using the center pin of an assembly jig.

Further, when both the FPC 41 and the air-core coil 40 are mounted to the base 50 in the second assembling process of the first embodiment, the positioning holes 41a, 40a and 50a are formed in respective parts at corresponding locations so that the parts can be precisely mounted to each other using the center pin of an assembly jig.

Further, when the air-core coil 40 is mounted to the circuit board member 50 in the second assembling process of the second embodiment, the positioning holes 40a and 50a are formed in respective parts at corresponding locations so that the parts can be precisely mounted to each other using the center pin of an assembly jig.

Although the embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A vibration generator, comprising:
 a casing that is open on one surface thereof;
 a weight provided inside the casing and configured to vibrate;
 a spring mounted inside the casing;
 a magnet inserted and installed through a first opening formed in the weight; and
 an air-core coil that is placed in such a way that the coil is spaced apart from the magnet by a predetermined gap,
 wherein a yoke having magnetism is installed on an opposite side surface facing the air-core coil in the magnet,
 wherein the spring is mounted to the casing at a first end thereof and is mounted to the weight at a second end thereof, and
 wherein the air-core coil is mounted to a base that is assembled so as to close the open surface of the casing,
 wherein the weight comprises a first weight having a depression and a second weight having a second opening, wherein the magnet is seated in the depression of the first weight and is inserted into the second opening of the second weight, with an interposition of a metal yoke.

2. The vibration generator as set forth in claim 1, wherein a vibration part comprises: a bracket providing a predetermined space in the casing, and the weight installed in the bracket.

3. The vibration generator as set forth in claim 2, wherein the casing and the bracket are provided with a plurality of positioning holes so as to allow an installing position of the bracket to be easily viewed when the bracket is installed in the casing.

4. The vibration generator as set forth in claim 1, wherein the spring surrounds the weight in a U-shaped form.

5. The vibration generator as set forth in claim 1, wherein the air-core coil is provided with an inner space therein and a core is installed in the inner space of the air-core coil.

6. The vibration generator as set forth in claim 1, wherein the weight comprises one weight having the opening, and both the magnet and the yoke are inserted in the opening of the weight.

7. A vibration generator, comprising:
a casing that is open on one surface thereof;
a weight provided inside the casing and configured to vibrate;
a spring mounted inside the casing;
a magnet configured for generating an electromagnetic force so as to cause the weight to vibrate horizontally; and
an air-core coil that is placed in such a way that the coil is spaced apart from the magnet by a predetermined gap,
wherein the weight has an inner space,
wherein the magnet and a metal yoke having magnetism are inserted and installed in the inner space of the weight,
wherein the metal yoke is attached to only one side surface of the magnet, so that an opposite side surface of the magnet faces the air-core coil,
wherein the spring is mounted to the casing at a first end thereof and is mounted to the weight at a second end thereof, and
wherein the air-core coil is mounted to a base that is assembled so as to close the open surface of the casing.

8. The vibration generator as set forth in claim 7, wherein a vibration part comprises: a bracket providing a predetermined space in the casing, and the weight installed in the bracket.

9. The vibration generator as set forth in claim 8, wherein the casing and the bracket are provided with a plurality of positioning holes so as to allow an installing position of the bracket to be easily viewed when the bracket is installed in the casing.

10. The vibration generator as set forth in claim 7, wherein the spring surrounds the weight in a U-shaped form.

11. The vibration generator as set forth in claim 7, wherein the air-core coil is provided with an inner space therein and a core is installed in the inner space of the air-core coil.

12. The vibration generator as set forth in claim 7, wherein the weight comprises a first weight having a depression and a second weight having a second opening, wherein the magnet is seated in the depression of the first weight and is inserted into the second opening of the second weight, with an interposition of the metal yoke.

13. The vibration generator as set forth in claim 7, wherein the weight comprises one weight having the opening, and both the magnet and the metal yoke are inserted in the opening of the weight.

* * * * *